US008845949B2

(12) United States Patent
Coeck

(10) Patent No.: US 8,845,949 B2
(45) Date of Patent: Sep. 30, 2014

(54) METHOD FOR REDUCING DIFFERENTIAL SHRINKAGE IN STEREOLITHOGRAPHY

(75) Inventor: Sam Coeck, Boutersem (BE)

(73) Assignee: Materialise N.V., Leuven (BE)

( * ) Notice: Subject to any disclaimer, the term of this patent is extended or adjusted under 35 U.S.C. 154(b) by 200 days.

(21) Appl. No.: 13/240,375

(22) Filed: Sep. 22, 2011

(65) Prior Publication Data

US 2012/0242007 A1 Sep. 27, 2012

Related U.S. Application Data

(60) Provisional application No. 61/386,652, filed on Sep. 27, 2010.

(30) Foreign Application Priority Data

Sep. 27, 2010 (GB) .................................. 1016169.3

(51) Int. Cl.
| | | |
|---|---|---|
| *B29C 35/08* | (2006.01) | |
| *B29C 41/02* | (2006.01) | |
| *B29C 71/04* | (2006.01) | |
| *B29C 67/00* | (2006.01) | |

(52) U.S. Cl.
CPC ......... *B29C 67/0085* (2013.01); *B29C 67/0066* (2013.01); *B29C 67/0088* (2013.01); *B29K 2995/0096* (2013.01)
USPC .......................................... 264/401; 700/120

(58) Field of Classification Search
USPC .................................. 264/308, 401; 700/120
See application file for complete search history.

(56) References Cited

U.S. PATENT DOCUMENTS

| | | | | |
|---|---|---|---|---|
| 5,076,974 | A * | 12/1991 | Modrek et al. ................ | 264/401 |
| 5,096,530 | A * | 3/1992 | Cohen .......................... | 156/229 |
| 5,104,592 | A * | 4/1992 | Hull et al. .................... | 264/401 |
| 5,123,734 | A * | 6/1992 | Spence et al. ................ | 356/121 |
| 5,182,055 | A * | 1/1993 | Allison et al. ................ | 264/401 |
| 5,238,639 | A * | 8/1993 | Vinson et al. ................ | 264/401 |
| 5,273,691 | A * | 12/1993 | Hull et al. .................... | 264/401 |
| 5,321,622 | A * | 6/1994 | Snead et al. .................. | 700/182 |
| 5,429,908 | A * | 7/1995 | Hokuf et al. .................. | 430/269 |
| 5,562,929 | A * | 10/1996 | Asano ........................ | 425/174.4 |
| 5,595,703 | A * | 1/1997 | Swaelens et al. ............ | 264/401 |
| 5,597,520 | A * | 1/1997 | Smalley et al. .............. | 264/401 |
| 5,599,424 | A * | 2/1997 | Matsumoto et al. ......... | 438/738 |
| 5,932,059 | A * | 8/1999 | Langer et al. ............... | 156/275.5 |
| 5,985,204 | A * | 11/1999 | Otsuka et al. ................ | 264/497 |
| 6,084,980 | A * | 7/2000 | Nguyen et al. ............... | 382/154 |
| 6,399,010 | B1 * | 6/2002 | Guertin et al. ............... | 264/401 |
| 6,406,658 | B1 * | 6/2002 | Manners et al. ............. | 264/401 |
| 6,699,424 | B2 * | 3/2004 | Nguyen et al. ............... | 264/401 |
| 6,995,334 | B1 * | 2/2006 | Kovacevic et al. ....... | 219/121.63 |
| 7,020,539 | B1 * | 3/2006 | Kovacevic et al. ........... | 700/166 |
| 2003/0001312 | A1 * | 1/2003 | Nguyen et al. ............... | 264/401 |
| 2013/0040091 | A1 * | 2/2013 | Dikovsky et al. ............. | 428/68 |

OTHER PUBLICATIONS

Zhang et al. ("Model layout optimization for solid ground curing rapid prototyping processes". Robotics and Computer-Integrated Manufacturing. vol. 18, Issue 1. Feb. 2002. pp. 41-51).*

* cited by examiner

*Primary Examiner* — Leo B Tentoni
(74) *Attorney, Agent, or Firm* — EIP US LLP

(57) ABSTRACT

The present invention relates to a new and improved stereolithography method and system for generating a three-dimensional object by forming successive, adjacent, cross-sectional laminae of that object, thereby providing an object being specially processed to reduce differential shrinkage.

18 Claims, 8 Drawing Sheets

METHOD FOR REDUCING DIFFERENTIAL SHRINKAGE IN STEREOLITHOGRAPHY

CROSS-REFERENCE TO RELATED APPLICATION

This application claims the benefit of U.S. Provisional Patent Application No. 61/386,652, filed on Sep. 27, 2010 and GB Patent Application No. 1016169.3, filed Sep. 27, 2010, the contents of which are herein incorporated by reference in their entireties.

FIELD OF THE INVENTION

The present invention relates to a new and improved stereolithography method and system for generating a three-dimensional object by forming successive, adjacent, cross-sectional laminae of that object, thereby providing an object being specially processed to reduce differential shrinkage.

BACKGROUND OF THE INVENTION

Stereolithography is a technique that belongs to the family of rapid prototyping and manufacturing techniques. Generally these techniques allow the fabrication of three-dimensional objects directly starting from computer generated CAD files. In stereolithography the parts are first divided into a stack of successive layers that represents the three-dimensional object as closely as possible. The object itself is then constructed on the machines according to the computer generated layers. First a layer of resin is deposited over the entire building area. Secondly the sections of the building area that are part of the object to be constructed are illuminated, thereby causing the resin on the illuminated areas to polymerize and harden. Upon completion of this layer a new layer of resin is deposited and the process is repeated until the object is completely finished. Then the solidified object can be removed from the resin and processed further. Stereolithography therefore represents a fast way to make complex or simple parts without tooling. As this technology depends on using a computer to generate its cross-sectional patterns, there is a natural data link to CAD/CAM.

However, objects built using stereolithography have a tendency to distort from their CAD designed dimensions. Differential shrinkage is one of the most disturbing flaws often detected in many parts fabricated by stereolithograpy. It is caused by the transition of the resin to the solidified polymer. This transition is accompanied by a shrinking of the material. Moreover certain geometries or sections in a part are more susceptible than others. Especially large flat surfaces are susceptible to shrinkage. Because not all sections show the same amount of shrinkage, or differential shrinkage, the parts are deformed and no longer correspond to their original CAD representation. For instance a large flat surface connecting to thin upright structures can lead to significant part deformation. Therefore, there is a need for a technique to reduce vertical distortions.

In the art there have been several efforts to try and avoid this type of deformation by changing the scanning techniques, by changing the pattern (e.g. the use of tightly packed hexagonal tiles in the pattern), the use of several subsequent exposures of the same lamina or by providing intermediate solidification steps for intermediate lamina or layers. Allison et al. (U.S. Pat. No. 5,256,340) disclose various scanning techniques for forming objects including various techniques for reducing object distortion. Vinson et al. (U.S. Pat. No. 5,238,639) disclose a technique for minimizing part curl by curing a balancing layer in relation to a balanced layer such that reverse curl of the balanced layer caused by the balancing layer offsets or negates normal curl of the balanced layer caused by the balancing layer. Hull et al. (U.S. Pat. No. 5,273,691) describe an improved stereolithography system with the aim of reducing curl, a phenomenon closely related to differential shrinkage. Different scanning techniques are described therein to accomplish this. Manners et al. (U.S. Pat. No. 5,965,079) describe a stereolithography method wherein a pattern of tightly packed hexagonal tiles are drawn with the aim of reducing shrinkage. Guertin et al. (U.S. Pat. No. 6,399,010) describe the use of a time delay between a first and second exposure of portions of a lamina. The delay may be determined by a clock, or alternatively, the time delay may be considered to have lapsed upon certain physical conditions being met. Manners et al. (U.S. Pat. No. 6,649,113) describe employing an intermediate solidification step for intermediate lamina or layers for reducing the amount of resin that will shrink upon solidification. Nguyen et al. (U.S. Pat. No. 6,699,424) describe a method that solidifies the main part area, delays or pauses for a desired period of time to permit shrinkage to occur, and then, in multiple drawings of the main part borders, solidifies the borders from the portion closest to the main part outwardly to the portion farthest from the main part.

Several of these techniques are based on a non-standard way of illuminating the areas to be polymerized. This however requires a complex redesign of the slicing and hatching software, leading to visible markings on the outside of the parts and negatively influencing quality of the part. Moreover these techniques also result in a slower construction time. Other prior art techniques rely on employing waiting times at moments in the building process where this is not normally done in the building process. This therefore requires complex redesign of both building and preparation software, leading to a slower production time and reduction of the quality of the produced parts.

Accordingly, there is a need in the art for improved stereolithography techniques. It is accordingly one of the aims of the present invention to overcome or ameliorate at least one of the disadvantages of the prior art, or to provide a useful alternative.

SUMMARY OF THE INVENTION

The present invention provides a new and improved stereolithography method and system for generating a three-dimensional object by forming successive, adjacent, cross-sectional laminae of that object out of a resin capable of altering its physical state in response to stimulation or illumination. The methods and tools of the present invention allow the generation of objects with reduced differential shrinkage and increased strength and with a large accuracy of reproduction.

It has been found that beside the geometry of the successive layers, parameters such as the stimulation power and pre-stimulation waiting time play a crucial role in minimizing differential shrinkage. Moreover, altering these parameters does not require complex redesign of the building nor of the preparation software as do other solutions and can therefore easily be incorporated into any existing software. Moreover the modulation of these parameters in the methods according to the invention leaves no visible markings on the parts nor does it have any negative effects on overall part quality.

In a first aspect the invention provides methods for the manufacturing of at least one three-dimensional object based on the subsequent deposition of lamina, in which method differential shrinkage is substantially reduced compared to the methods known in the state of the art. More particularly, the methods of the invention which relate to the formation of objects comprises a plurality of adhered laminae, wherein the methods comprise taking into account parameters of preceding and/or following lamina in determining the stimulation power of a lamina n and/or the pre-stimulation time of the lamina n+1. More particularly, the methods of the invention comprise the steps of:
a) depositing a layer of a resin, preferably a liquid resin, over a manufacturing area comprising previously formed lamina n−1 of said object;
b) selecting a stimulation power for forming layer n, wherein said stimulation power is either a predetermined value or a value based upon parameters of one or more laminas selected from laminas n−5 to n+5 such as to minimize shrinkage or deformation of said object;
c) exposing at least part of said manufacturing area to stimulation according to a stimulation pattern determined based on a computer-generated CAD file of the object using the stimulation power selected in step b, thereby polymerizing the resin of the stimulated areas and forming a lamina n of said object;
d) selecting the pre-stimulation waiting time for forming lamina n+1, wherein said pre-stimulation waiting time is either a predetermined value or a value based on parameters of one or more of laminas n−5 to n+5 such as to minimize shrinkage or deformation of said object; and;
e) successively repeating steps a) through d) where in at least one of steps (b) and (d) a non predetermined value is chosen.

In particular embodiments of the invention, parameters of the next layer are used to adjust the features of the manufacturing process, more particularly the stimulation power of layer n and/or the pre-stimulation time of layer n+1. Thus, in particular embodiments, the methods of the invention comprise the steps of:
a) depositing a layer of a resin, preferably a liquid resin, over a manufacturing area comprising previously formed lamina n−1 of said object;
b) selecting a stimulation power for forming layer n, wherein said stimulation power is either a predetermined value or a value based upon parameters of laminas n and/or n+1 such as to minimize shrinkage or deformation of said object;
c) exposing at least part of said manufacturing area to stimulation according to a stimulation pattern determined based on a computer-generated CAD file of the object using the stimulation power selected in step (b), thereby polymerizing the resin of the stimulated areas and forming a lamina n of said object;
d) selecting the pre-stimulation waiting time for forming lamina n+1, wherein said pre-stimulation waiting time is either a predetermined value or a value based on parameters of lamina n such as to minimize shrinkage or deformation of said object;
e) successively repeating steps a) through d) where in at least one of steps (b) and (d) a non-predetermined value is chosen.

More particularly the parameters for determining the stimulation power for lamina n are chosen from the group comprising the total scanning distance and/or the total jumping distance of the stimulation pattern for lamina n, the pre-stimulation waiting time applied for lamina n+1 and/or the resin type. The parameters for determining the pre-stimulation waiting time for lamina n+1 are chosen from the group comprising the total scanning distance and/or the total jumping distance of the stimulation pattern for lamina n, stimulation power applied for lamina n and/or the resin type.

In particular embodiments the present invention relates to methods wherein the stimulation power for layer n is determined by fuzzy logic.

In more particular embodiments the present invention relates to methods wherein the pre-stimulation waiting time for layer n+1, is determined by fuzzy logic.

According to particular embodiments, the present invention relates to methods wherein the layers or laminas comprise at least two separate sections or fields, and whereby the stimulation power for layer n of each of said sections or fields is determined separately. Each of said sections or fields is illuminated according to the separately determined stimulation powers.

According to more particular embodiments, the present invention relates to methods wherein the layers or laminas comprise at least two separate sections or fields, and whereby the stimulation power for layer n of each of said sections or fields is determined separately. The stimulation power for the entire lamina n is determined as the minimum of all stimulation powers for said sections or fields.

According to even more particular embodiments, the present invention relates to methods wherein the layers or laminas comprise at least two separate sections or fields, and whereby the pre-stimulation waiting time for layer n+1 is determined based on a calculation of the pre-stimulation waiting time for each of said sections or fields. The pre-stimulation waiting time used for layer or lamina n+1 is determined as the maximum of all pre-stimulation waiting times for said sections or fields.

According to even more particular embodiments, the present invention relates to methods which further comprise a step of comparing the estimated manufacturing time with the desired total manufacturing time and adjusting the pre-stimulation waiting time and/or the stimulation power accordingly.

According to particular embodiments, the present invention relates to methods wherein said lamina comprise or can be divided into at least two separate sections or fields with different calculated pre-stimulation waiting times, and the methods comprise adjusting the order in which the sections or fields are exposed, whereby the section(s) or fields for which the highest pre-stimulation waiting time is calculated is (are) exposed first.

According to further embodiments, the present invention provides methods for optimizing the build of different objects by additive manufacturing, which methods comprise,
(a) determining the optimal pre-stimulation waiting time for the different layers of each object by determining the pre-stimulation waiting time for each layer based on the total scanning distance and the total jumping distance of the scanning vectors, the stimulation power applied and the liquid resin type such as to minimize shrinkage or deformation of said object; and;
(b) selecting to combine the manufacture of two or more of said objects on one manufacturing platform based on a comparison of the optimal pre-stimulation waiting times of said objects.

According to particular embodiments, the present invention relates to methods wherein the orientation and/or distribution of said two or more objects is adapted based on a comparison of the optimal pre-stimulation waiting times of the two or more objects.

In another aspect, the present invention provides apparatuses for the manufacturing of at least one three-dimensional object or at least a portion thereof comprising a plurality of adhered laminae, whereby the apparatus is characterized in that it comprises:

a) a means for depositing a layer of a liquid resin over a manufacturing area comprising previously formed lamina n−1 of said object, b) a means for exposing at least part of said manufacturing area to stimulation according to a stimulation pattern determined based on a computer-generated CAD file of the object, thereby polymerizing the resin of the exposed areas and forming a lamina n of said object wherein the apparatus is programmed to successively repeat steps (a) and (b), and to determine the stimulation power for each lamina n based on parameters of one or more of layers n−5 to n+5 and/or to determine the pre-stimulation waiting time for each lamina n+1 based on parameters of one or more of layers n−5 to n+5. In particular embodiments, parameters of layer n and n+1 are taken into account and the apparatus is programmed to determine the stimulation power for each lamina n based on the total scanning distance and the total jumping distance of the scanning vectors of layer n, pre-stimulation waiting time for layer n+1 and the liquid resin type and/or to determine the pre-stimulation waiting time for each lamina n+1 based on the total scanning distance and the total jumping distance of the scanning vectors of layer n, the light source power applied for layer n and the liquid resin type.

Figure 1A:
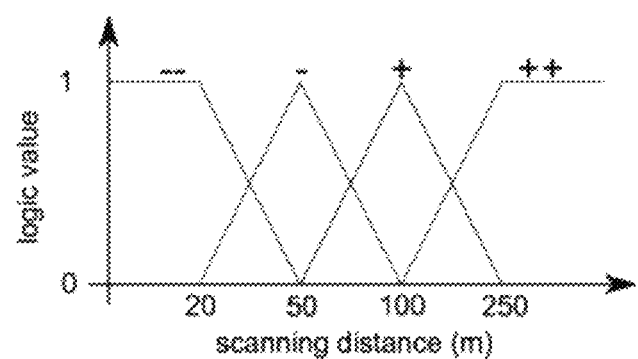
FIG. 1 provides a graph illustrating a relation between the fuzzy logic value and the scanning distance (a) and a relation between the fuzzy logic value and the ratio of Scan distance over jump distance (b), according to a particular embodiment of the invention.

Each of these illustrations represents particular embodiments of the features concerned and the corresponding features are not to be interpreted as limited to this specific embodiment.

DETAILED DESCRIPTION OF THE INVENTION

The terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of ±10% or less, preferably ±5% or less, more preferably ±1% or less, and still more preferably ±0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention provides new and improved stereolithography methods and systems for generating a three-dimensional object by forming successive, adjacent, cross-sectional laminae of that object at the face of a resin capable of altering its physical state in response to stimulation, more particularly, illumination, which methods are characterized in that differential shrinkage of the object is reduced compared to similar methods described in the prior art. The reduction of shrinkage in the stereolithographic production of 3D objects may have one or more of the advantages described herein. In particular embodiments, the methods are characterized in that the methods have a large accuracy of reproduction.

The inventor has found that for the manufacturing of an object through stereolithography, parameters specific for one or more previous or following layers can be used for determining optimal conditions for layers n (including the pre-stimulation time for n+1) to reduce shrinkage. This has been specifically worked out for layers n and n+1 in the description herein. However, it will be understood to the skilled person, that similar methods can be developed wherein the parameters of more than one preceding or following layer are also taken into account.

Accordingly, in particular embodiments, the invention relates to the observation that parameters specific for lamina n can be used for determining optimal conditions for layer n+1 to reduce shrinkage. Additionally it has been found that a combination of parameters specific for lamina n and parameters specific for lamina n+1 can be used for determining further parameters for lamina n to reduce shrinkage. More particularly the length of the pre-stimulation waiting time before the stimulation of lamina n+1 and/or the stimulation power can be adjusted for layer n, which will reduce the shrinkage of the object. According to particular embodiments of the present invention these parameters specific for lamina n are used for determining the waiting time for lamina n+1 and/or parameters specific for lamina n and n+1 are used for determining the stimulation power for lamina n.

In a first aspect the invention provides methods for the manufacturing of at least one three-dimensional object, which can be a part of a final object, which method involves the subsequent deposition of adhering lamina, which methods are characterized in that the objects obtained thereby are subject to decreased differential shrinkage.

The methods of the present invention are methods of stereolithography.

As used herein, the term "stereolithography" relates to an additive manufacturing process wherein a three-dimensional (3D) object is fabricated a layer or lamina at a time, by depositing a first layer of resin over an entire building area, stimulating the sections of the building area that are part of the 3D object to be constructed, thereby causing the resin on the stimulated areas to polymerize and harden and form a lamina. Upon completion of this lamina a new layer of resin is deposited and the process is repeated until the object is completely finished.

As used herein, the term "resin" relates to polymerizable material, a mixture of monomers, oligomers and/or polymers that cures or becomes solid, when exposed to stimulation energy, preferably light in the ultraviolet spectrum. Preferably said resin is a powdered or liquid resin. Some commercial brands worldwide include DSM Somos®, Huntsman Renshape® and 3D Systems Accura resins.

Typically, the present invention relates to methods which comprise the steps of:
a) depositing a layer of a resin, preferably a liquid resin, over a manufacturing area comprising previously formed lamina n−1 of said object;
b) exposing at least part of said manufacturing area to stimulation according to a stimulation pattern determined based on a computer-generated CAD file of the object, thereby polymerizing the resin of the stimulated areas and forming a lamina n of said object; and;
c) successively repeating steps (a) and (b) whereby the successive layers adhere to form the object.

As used herein, the term "stimulation" refers typically to illumination by using visible or ultraviolet light or electromagnetic radiation. The radiation is typically produced by a laser. Exposure to the UV laser light cures or solidifies the pattern traced on the resin and adheres it to the lamina below. Of course, it will be appreciated that other forms of appropriate stimulation for a resin, such as particle bombardment (electron beams and the like), chemical reactions by spraying materials through a mask or by ink jets, or impinging radiation other than ultraviolet light, may be used in the practice of the invention without departing from the spirit and scope of the invention. The stimulation power refers to the strength of the stimulation or illumination provided in for instance milliWatt.

On each layer of resin a specific pattern is stimulated or illuminated, thereby initiating the solidification process on the stimulated or illuminated pattern. The solidification process typically consists of the solidification of various regions, which are typically classified as "vector types". The use of boundary, hatch, and fill vectors is well known in the art, and taught in a number of the previously cited publications and patents. The words "vector" and "line" are often used interchangeably, most commonly when referring to a portion of material that has been solidified. In other cases, "vector" refers mainly to the data supplied, while "line" may refer mainly to the solidified portion. Apart from the use of scanning vectors for the determination of the illumination pattern it will be appreciated that other ways of generating illumination patterns are also envisaged such as spatial light modulation (SLM); as used by Envisiontec, 3D Systems or Huntsman and as described for instance in U.S. Pat. No. 5,247,180 (to Texas Instruments Incorporated) and W00021735 (to Dicon AS), which are incorporated herein by reference. Envisiontec and 3D Systems VFlash technologies use a surface illumination technique based on a 'mask' type illumination, whereas the Huntsman Digitalis system combines vector and surface based illumination.

According to the present invention, methods are provided for the provision of objects comprising a plurality of adhered laminae, more particularly stereolithography methods are provided, which methods comprise the steps of:
a) depositing a layer of a resin, preferably a liquid resin, over a manufacturing area comprising previously formed lamina n−1 of said object;
b) selecting a stimulation power for forming layer n, wherein said stimulation power is either a predetermined value or a value based upon parameters of one or more laminas selected from laminas n−5 to n+5 such as to minimize shrinkage or deformation of said object;
c) exposing at least part of said manufacturing area to stimulation according to a stimulation pattern determined based on a computer-generated CAD file of the object using the stimulation power selected in step b, thereby polymerizing the resin of the stimulated areas and forming a lamina n of said object;
d) selecting the pre-stimulation waiting time for forming lamina n+1, wherein said pre-stimulation waiting time is either a predetermined value or a value based on parameters of one or more of laminas n−5 to n+5 such as to minimize shrinkage or deformation of said object; and;
e) successively repeating steps a) through d) where in at least one of steps (b) and (d) a non predetermined value is chosen.

Wherein layers n−5 to n+5 comprise layers n−5, n−4, n−3, n−2, n−1, n, n+1, n+2, n+3, n+4, and n+5. It is envisaged that one or more parameters of one or more of each of these layers can be taken into account. Typically, however, only a few preceding and/or following layers will be taken into account. In particular embodiments parameters of one or more laminas from laminas n−2 to n+2 are taken into account.

The methods of the invention have been particularly worked out for embodiments which take into account the parameters of layers n and n+1. Such that, in particular embodiments, the methods of the invention comprise the steps of:
a) depositing a layer of a resin, preferably a liquid resin, over a manufacturing area comprising previously formed lamina n−1 of said object;
b) selecting a stimulation power for forming layer n, wherein said stimulation power is either a predetermined value or a value based upon parameters of laminas n and/or n+1, such as to minimize shrinkage or deformation of said object;
c) exposing at least part of said manufacturing area to stimulation according to a stimulation pattern determined based on a computer-generated CAD file of the object using the stimulation power selected in step (b), thereby polymerizing the resin of the stimulated areas and forming a lamina n of said object;
d) selecting the pre-stimulation waiting time for forming lamina n+1, wherein said pre-stimulation waiting time is either a predetermined value or a value based on parameters selected for lamina n such as to minimize shrinkage or deformation of said object;
e) successively repeating steps a) through d) where in at least one of steps (b) and (d) a non predetermined value is chosen.

As used herein, the term "waiting time" or "pre-stimulation waiting time" corresponds to the art-recognized term for the time period between the exposure of a resin layer on the manufacturing area to stimulation causing polymerization of the resin in the stimulated areas forming lamina n and the subsequent stimulation of resin for forming lamina n+1. Typically the pre-stimulation time is used in the form of a pre-dip or post-dip waiting time, respectively the waiting times inserted before and after the recoating of the resin forming layer n+1.

According to the present invention, shrinkage of an object formed by stereolithography can be reduced or minimized by ensuring the appropriate pre-stimulation waiting time and/or the appropriate stimulation power. The appropriate pre-stimulation waiting time and/or stimulation power are determined by different parameters, which can include parameters of one or more of the previous, present and next layers.

It will be understood by the skilled person that successive layers in the methods of the present invention are referred to as "n−1", "n" and "n+1" to indicate the order of the laminas but that each successive layer is upon formation to be considered as a layer "n".

According to a particular embodiment, the parameters for determining the stimulation power for lamina n are chosen from the group comprising the total scanning distance and/or the total jumping distance of said stimulation pattern for lamina n, the pre-stimulation waiting time applied for lamina n+1 and/or the resin type and the parameters for determining the pre-stimulation waiting time for lamina n+1 are chosen from the group comprising the total scanning distance and/or the total jumping distance of said stimulation pattern for lamina n, stimulation power applied for lamina n and/or the resin type.

The "total scanning distance" as used herein refers to the distance or size of the stimulated pattern. Typically when stimulation occurs through laser illumination, the total scanning distance refers to the total distance the laser illuminates the manufacturing area when illuminating the stimulation pattern. Where stimulation is performed based on scanning vectors, the total scanning distance can for instance be determined by the addition of distances of all scanned vectors in that layer.

The "total jumping distance" as used herein refers to the distance the stimulation source, such as for instance the laser spot, moves without illuminating the manufacturing area. It should be noted that it will be apparent to a person skilled in the art from this disclosure, that the distance used for the calculation of the total scanning distance and/or the total jumping distance may also be determined according to the time and velocity the apparatus fulfilling the stimulation.

It will be appreciated that for methods not employing a vector based illumination technique, other parameters may be determined which describe the size and shape of the illuminated area.

Indeed, different methods can be developed by the skilled person to describe a section of an object, which reflect a ratio between the surface and the expanse of the section. Large surfaces with limited level of expanse are very much subject to shrinkage, while small surfaces are almost never subject to shrinkage. Expanded shapes such as a long band or ribbon will not shrink very much unless they encompass a very large surface. For example, such methods can e.g. take into account the surface/circumference ratio, involve finding where the largest circle can be placed to identify the most shrink-sensitive area, etc. . . . . . The skilled person will understand that different methods can be developed to describe a parameter which aims to represent the sensitivity to shrinkage of the section.

The resin type used in the stereolithographic methods of the present invention also plays an important role as some particular types of resin are more susceptible to differential shrinkage compared to others.

In addition to the parameters described above, it can be envisaged that parameters are taken into account which are determined, i.e. measured during the manufacturing techniques according to the invention. Indeed, it can be envisioned e.g. to measure the stimulation power that is effectively applied, so as to be able to take into account potential deviations of the power source. Additionally and/or alternatively, one or more features of the object may be measured during manufacturing and can be taken into account during the production process.

It has been found that adjusting the stimulation power and/or pre-stimulation waiting time based on the parameters described above can result in methods wherein differential shrinkage is minimized. Accordingly, the invention envisages the use of an algorithm which translates the influence of the above-mentioned parameters into the optimal pre-stimulation waiting time and/or stimulation power to minimize shrinkage as a result of differential hardening of the layers. Altering the pre-stimulation waiting time and/or stimulation power does not require complex redesign of the building nor of the preparation software as do other solutions and can therefore easily be incorporated into any existing software. Moreover the adjustment of these features in additive manufacturing methods according to the invention leaves no visible markings on the parts nor does it have any negative effects on other aspects of quality of the object. To the contrary, the objects made by the methods according to the invention are of higher quality in that reduced shrinkage not only ensure a better appearance of the object but may also contribute to the strength of the object and to its functionality. As such the methods also have improved reproducibility.

The relationship between the parameters of the different successive layers can be represented by an algorithm. This is demonstrated herein specifically for layers n and n+1. More particularly, it is demonstrated that the relationship between the parameters of layer n and/or n+1 and the required pre-stimulation waiting time for layer n+1 and/or stimulation power for layer n in order to reduce or avoid shrinkage can be represented by an algorithm. According to particular embodiments, the pre-stimulation waiting time and/or stimulation power in the methods of the invention is determined by fuzzy logic. Fuzzy logic refers to a form of multi-valued logic derived from fuzzy set theory to deal with reasoning that is approximate rather than precise. In fuzzy logic the variables may have a truth value that ranges between 0 and 1 and the truth value is therefore not constrained to the two truth values of classic propositional logic.

According to particular embodiments, the methods according to the invention involve the use of stimulation power optimized to reduce shrinkage, wherein said stimulation power (P) is determined according to Formula I:

$$P = P_{st} \cdot \frac{T_p \cdot f_{resin}}{T_{ref}} \quad \text{(Formula I)}$$

wherein $T_p$ refers to said pre-stimulation time, $T_{ref}$ refers to a reference pre-stimulation time, $f_{resin}$ refers to the resin scaling factor and $P_{st}$ refers to the power calculated based on the total scanning distance and the total jumping distance.

According to particular embodiments, the methods according to the invention involve the use of pre-stimulation waiting times optimized to reduce shrinkage, wherein said pre-stimulation waiting time ($T_p$) is determined according to Formula II:

$$T_p = T_{st} \cdot \frac{P \cdot f_{resin}}{P_{ref}} \quad \text{(Formula II)}$$

wherein P refers to said light source power, $P_{ref}$ refers to a reference stimulation power, $f_{resin}$ refers to the resin scaling factor and $T_{st}$ refers to the time calculated based on the total scanning distance and the total jumping distance.

The use of fuzzy logic provides the methods according to the invention with a continuous range of pre-stimulation waiting times and/or stimulation powers not limited to a number of predefined values or ranges, as is the case for common practice where the machine operator manually selects one or several waiting times and/or powers or systems described in prior art or where a computer algorithm makes an automated selection from a number of predefined values.

In particular embodiments, the invention envisages a further optimization of the production of three dimensional objects through stereolithography, by determining the optimal pre-stimulation waiting time for layer n+1 not merely based on parameters determined by the whole of layer n, but based on different parameters determined for subsections of layer n. Indeed, as the parameters may differ significantly within subsections of a layer, there may be a significant difference between the pre-stimulation waiting time determined based on the whole of the layer and the pre-stimulation waiting time as determined for a sub-section. To minimize shrinkage the maximal waiting time required for a subsection of the layer should be taken into account.

Accordingly, in particular embodiments, the present invention relates to methods wherein said layer or lamina comprise at least two separate sections or fields, said stimulation power and/or pre-stimulation waiting time being calculated for each of said sections or fields and wherein the stimulation power used for said layer is determined as the minimum of all stimulation powers for said sections or fields and/or wherein the pre-stimulation waiting time used for said layer is determined as the maximum of all pre-stimulation waiting times for said sections or fields.

In these methods, optimal reduction of shrinkage is obtained by determining the pre-stimulation waiting time for layer or lamina n+1 as the maximum (highest value) of all pre-stimulation waiting times determined for said sections or fields. This further optimizes the production process of the object. Optionally, the different pre-stimulation waiting times can be taken into account in the orientation of the object in the manufacturing device (as will be detailed below).

In more particular embodiments, the invention envisages a further optimization of the production of three dimensional objects through stereolithography, by determining the optimal stimulation power not merely based on parameters determined by the whole of layer n, but based on different parameters determined for subsections of layer n. To minimize shrinkage the minimal stimulation power required for a subsection of the layer should be taken into account or, more preferably, each section should be stimulated with the according stimulation power.

In further particular embodiments, the invention envisages optimization of the production process by determining the optimal pre-stimulation waiting time and/or stimulation power for each section based on the parameters determined for individual stimulation patterns or scanning vectors.

Accordingly, in particular embodiments, the present invention relates to methods wherein a stimulation power and/or a pre-stimulation waiting time is calculated for each stimulation pattern or scanning vectors within said field, and wherein the stimulation power of said field is determined as the minimum of all stimulation powers for said stimulation patterns and/or the pre-stimulation waiting time of said field is determined as the maximum of all pre-stimulation waiting times for said stimulation patterns.

In further particular embodiments, the type of the stimulation patterns or vectors is taken into account and waiting times are determined for each stimulation pattern. It is envisaged that certain types of scanning vectors will generate higher pre-stimulation waiting times than others.

Accordingly, in particular embodiments said layer or lamina comprise at least two separate sections or fields, said stimulation power being calculated for each of said sections or fields and wherein each of said sections or fields is stimulated according to the calculated stimulation power.

In particular embodiments a pre-stimulation waiting time is calculated for each specific type of stimulation pattern or type of scanning vector within said section or field, and the pre-stimulation waiting time of said layer or of said section or field is determined as the maximum of all pre-stimulation waiting times for said specific types of stimulation patterns or types of scanning vectors.

It is moreover noted that, depending on the nature of the object to be made and its desired characteristics, the solidification process typically consists of the solidification of various regions, which are classified as "specific types of stimulation pattern". The pattern can be divided into several sections such as a border, skinfill, etc. In this context, the use of boundary, hatch, and fill scanning vectors is also well known in the art. It will be clear to the skilled person that the presence of such specific types of stimulation pattern can be taken into account in the methods according to the present invention.

According to particular embodiments, a stimulation power is calculated for each stimulation pattern within said field, wherein each of said stimulation patterns is stimulated according to the calculated stimulation power.

According to particular embodiments, a pre-stimulation waiting time is calculated for each specific type of stimulation pattern within said section or field, and the pre-stimulation waiting time of said section or field is determined as the maximum of all pre-stimulation waiting times for said specific type of stimulation pattern.

In particular embodiments the methods described above are designed to further take into account external factors, such as the total manufacturing time required or available.

The total manufacturing time can be determined as the total time required for each of the process steps for each of the layers. This time is divided into three groups: the pre-stimulation waiting time, the time required for stimulation and the rest times required for processes such as recoating, measuring . . . etc. The estimated total manufacturing time refers to the total manufacturing time estimated on the basis of the drawings of the object, whereas the desired total manufacturing time refers to a time set by a user. Depending on the desired total manufacturing time the stimulation power and/or the pre-stimulation waiting time for each layer can be adjusted to either optimize quality of said object, when the desired total manufacturing time is longer than the estimated manufacturing time, or to reduce total building time when the desired total manufacturing time is shorter than the estimated manufacturing time.

Indeed, in situations where the total manufacturing time available is longer than the estimated manufacturing time (e.g. overnight production), or where a limited build time increase can be tolerated, it is possible to further optimize production and/or reduce shrinkage by adjusting the waiting times and/or stimulation power.

Accordingly, in particular embodiments of the methods of the present invention, the step of determining the stimulation power and/or pre-stimulation waiting time for each layer deposited is performed taking into account a desired total manufacturing time which is longer than the estimated manufacturing time and includes adjusting said stimulation power and/or said pre-stimulation waiting time for each layer accordingly to optimize quality of said object.

In other situations, it may be necessary to reduce total manufacturing time, in view of commercial or management constraints. Similarly, it is possible to adjust waiting time and/or stimulation power taking this into account.

Accordingly, in particular embodiments, in the methods of the present invention the step of determining the stimulation power and/or pre-stimulation waiting time for each layer deposited is performed taking into account a desired total manufacturing time which is longer than the estimated manufacturing time and adjusting said stimulation power and/or said pre-stimulation waiting time for each layer accordingly to optimize quality of said object.

The methods according to the present invention may therefore comprise a step of comparing the estimated manufacturing time with the desired total manufacturing time and adjusting the pre-stimulation waiting time and/or the stimulation power accordingly. In this context the end time refers to the time when the manufacturing time is calculated to end.

Accordingly, in particular embodiments, in the methods of the present invention the step of determining the stimulation power and/or pre-stimulation waiting time for each layer deposited is performed taking into account a desired total manufacturing time which is shorter than the estimated manufacturing time and adjusting said stimulation power and/or said pre-stimulation waiting times accordingly to reduce total building time.

In particular embodiments of the methods of the invention, wherein said comparison is performed in advance and the pre-stimulation waiting time and/or stimulation power for the different layers is adjusted accordingly.

Additionally or alternatively, in the methods of the present invention said comparison is performed after one or more layers and the pre-stimulation waiting time and/or stimulation power for the subsequent layer(s) is adjusted accordingly.

After building a first layer the estimated total manufacturing time is re-evaluated taking into account the newly measured laser powers and possible changes in the data files. Then two times are calculated: the time left to the estimated end time using the current set of pre-stimulation waiting times, the scan times (taking into account new information concerning stimulation power) and rest times, and the time left to the desired end time. Based on the difference of these two and the pre-stimulation waiting times and/or stimulation powers of the layers that are still to come a new set of pre-stimulation waiting times and/or stimulation powers is proposed with which the estimated end time and desired end time are (almost) equal. Then the following layer is built, using the newly calculated pre-stimulation waiting time and/or stimulation power. After this the total build time estimate is again re-evaluated, the times left are calculated and the new pre-stimulation waiting times and/or stimulation powers are calculated. This process is repeated until the build has finished.

The above-described methods make it possible to work out inaccuracies of the initial build time estimate, take into account changing machine parameters (loss of power, slower recoating etc.), and ensures maximal flexibility to cope with a changing production environment. Indeed, the user can change the desired end-time during the building process and the algorithm will take this into account.

Alternatively the comparison between the estimated manufacturing time with the desired total manufacturing time is performed prior to the start of manufacturing and the pre-stimulation waiting time and/or stimulation power for all layers is adjusted accordingly.

It is noted that, irrespective of the above, different regimes can be considered for adjusting the pre-stimulation waiting time and/or stimulation power of the different layers. Indeed, one can envisage to increase/decrease the stimulation waiting time and/or stimulation power by the same amount for all layers, to linearly increase/decrease the stimulation waiting times and/or stimulation powers, or to increase/decrease the stimulation waiting times and/or stimulation powers differentially, based on their values.

For example, it can be envisaged that in a particular embodiment, the overall building time can be increased and it is selected to increase all pre-stimulation waiting times by the same amount. A formula to increase all pre-stimulation waiting times by the same amount is:

$$\frac{\text{desired entime} - \text{estimated endtime}}{\text{number layers to come}}$$

A formula that can be used to increase all pre-stimulation waiting times linearly is $$t_{new} = t_{old} * \frac{(\text{desired endtime} - \text{estimated endtime}) + \text{total prestimulation}}{\text{total prestimulation}}$$

Where "prestimulation" refers to "pre-stimulation waiting time", $t_{new}$ is the new pre-stimulation waiting time and $t_{old}$ the old pre-stimulation waiting time.

In an alternative embodiment, it is envisaged that the total building time is to be decreased. The user should be aware that when this is allowed, there is a risk that part quality is decreased compared to the standard situation. A similar formula for decreasing all pre-stimulation waiting times by the same amount is:

$$\frac{\text{estimated endtime} - \text{desired endtime}}{\text{number layers to come}}$$

According to a particular embodiment of the methods of the present invention, all pre-stimulation waiting times and/or stimulation powers are increased or decreased proportionally.

More particularly, the present invention envisages methods wherein a reduction of the total building time is required, and the stimulation powers are adjusted such that the higher powers are increased the most and/or the pre-stimulation waiting times are adjusted such that the lower waiting times are reduced the most.

An example formula for decreasing the lowest times most is:

$$t_{new} = t_{old} * \left(2 \frac{1}{1 - \exp\left(-\frac{t_{old}}{p}\right)}\right)$$

where $t_{new}$ is the new pre-stimulation waiting time, $t_{old}$ the old pre-stimulation waiting time and p a parameter that can be varied from 0 to 25 (or more, depending on how far one would allow the times to drop) such that the total time gain is sufficient. The biggest advantage of such a method is that the shrinkage sensitive sections are still allowed sufficient time.

According to alternative particular embodiments, the present invention relates to methods wherein a reduction of the total building time is required and the stimulation powers are adjusted such that the highest stimulation powers are increased the most.

According to yet alternative particular embodiments, the present invention relates to methods wherein an increase of the total building time is required and the stimulation powers are adjusted such that the lower powers are decreased the most and/or the pre-stimulation waiting times are adjusted such that the higher waiting times are increased the most.

As indicated above, according to particular embodiments the present invention relates to methods wherein the lamina comprise at least two separate subsections or fields with different calculated pre-stimulation waiting times, and said method comprises adjusting the order in which the subsections or fields are exposed, whereby the subsection(s) or fields for which the highest pre-stimulation waiting time is calculated is(are) exposed first.

This allows an optimization of the production method. Indeed, for these subsections, polymerization and waiting can start while the remainder of the subsections is still being stimulated. In these embodiments the remaining stimulation time, corresponding to the time required for the stimulation of the remainder of the subsections or fields of the manufacturing area, is taken into account.

Indeed, as a way for eliminating or at least minimizing the impact that the pre-stimulation waiting time has on total building time, it is possible to use a smart exposure pattern that exposes areas with the longest pre-stimulation waiting times first, followed by exposure of less critical areas with the smallest pre-stimulation waiting times. In effect, the count down of the pre-stimulation waiting time can begin as soon as the exposure of a particular critical region is finished.

In another aspect, the methods of the present invention can be used to optimize the manufacturing of different objects simultaneously. Such methods envisage taking into account the optimal pre-stimulation waiting times for different objects, and combining the manufacture of the objects accordingly.

Accordingly, in particular embodiments the present invention relates to methods for optimizing the build of different objects by additive manufacturing, which methods comprise, (a) determining the optimal pre-stimulation waiting time for the different layers of each object by determining the pre-stimulation waiting time for each layer based on the total scanning distance and the total jumping distance of the scanning vectors, the stimulation power applied and the liquid resin type such as to minimize shrinkage or deformation of said object; and;
(b) selecting to combine the manufacture of two or more of said objects on one manufacturing platform based on a comparison of said optimal pre-stimulation waiting times of said objects.

In particular embodiments of the methods of the present invention the orientation and/or distribution of said two or more objects is adapted based on a comparison of the optimal pre-stimulation waiting times for said objects.

A further aspect of the invention provides tools and apparatuses suitable for carrying out the methods according to the invention, i.e. tools and apparatuses suitable for manufacturing an object by stereolithography, in which shrinkage of the object is limited. According to particular embodiments, the present invention provides apparatuses for the manufacturing of at least one three-dimensional object or at least a portion thereof comprising a plurality of adhered laminae, comprising:
a) a means for depositing a layer of a liquid resin over a manufacturing area comprising previously formed lamina n−1 of said object;
b) a means for exposing at least part of said manufacturing area to stimulation according to a stimulation pattern determined based on a computer-generated CAD file of the object, thereby polymerizing the resin of the exposed areas and forming a subsequent lamina n of said object wherein said apparatus is programmed to successively repeat steps (a) and (b), and to determine the pre-stimulation waiting time and/or stimulation power for each lamina based on parameters of one or more laminas selected from lamina n−5 to n+5 such as to minimize shrinkage or deformation of said object. In more particular embodiments the parameters are parameters of laminas n and/or n+1.

According to a particular embodiment, the present invention provides an apparatus, comprising:
a) a means for depositing a layer of a resin, preferably a liquid resin, over a manufacturing area comprising previously formed lamina n−1 of said object;
b) a means for selecting a stimulation power for forming layer n either choosing a predetermined value or a value based upon parameters of one or more of laminas n−5 to n=5 such as to minimize shrinkage or deformation of said object;
c) a means for exposing at least part of said manufacturing area to stimulation according to a stimulation pattern determined based on a computer-generated CAD file of the object using the stimulation power previously selected, thereby polymerizing the resin of the stimulated areas and forming a lamina n of said object;
d) a means for selecting the pre-stimulation waiting time for forming lamina n+1 either choosing a predetermined value or a value based on parameters of one or more of laminas n−5 to n+5 such as to minimize shrinkage or deformation of said object;
wherein said apparatus is programmed to successively repeat steps (a) through (d) and where in at least one of steps (b) and (d) a non predetermined value is chosen. In particular embodiments, the apparatus comprises a means for selecting a stimulation power for forming layer n by choosing a value based upon parameters laminas n and/or n+1 and/or a means for selecting the pre-stimulation waiting time for forming lamina n+1 by choosing a value based on parameters of lamina n.

In further particular embodiments the parameters for determining the stimulation power for lamina n are chosen from the group comprising the total scanning distance and/or the total jumping distance of said stimulation pattern for lamina n, the pre-stimulation waiting time applied for lamina n+1 and/or the resin type. The parameters for determining the pre-stimulation waiting time for lamina n+1 are chosen from the group comprising the total scanning distance and/or the total jumping distance of said stimulation pattern for lamina n, stimulation power applied for lamina n and/or the resin type.

According to particular embodiments, the present invention relates to an apparatus according to the present invention, wherein said parameters for determining the stimulation power for lamina n are chosen from the group comprising the total scanning distance and/or the total jumping distance of said stimulation pattern for lamina n, the pre-stimulation waiting time applied for lamina n+1 and/or the resin type.

According to particular embodiments, the present invention relates to an apparatus according to the present invention, wherein said parameters for determining the pre-stimulation waiting time for lamina n+1 are chosen from the group comprising the total scanning distance and/or the total jumping distance of said stimulation pattern for lamina n, stimulation power applied for lamina n and/or the resin type.

In order to better explain the characteristics of the invention, the following particular embodiments are described as examples only without intending to be limitative in any way.

EXAMPLES

Example 1

The present example describes a particular embodiment according to the present invention wherein the pre-stimulation waiting time ($T_p$) is determined according to Formula II for a P equal to $P_{ref}$ and a resin scaling factor of 1 and wherein $T_{st}$ is determined by the following fuzzy system:

TABLE 1

|  |  | Scan distance logic value | | | |
|---|---|---|---|---|---|
|  |  | Very high | High | Low | Very low |
| Ratio of Scan distance over jump distance logic valve | Very high | ++ | ++ | + | + |
|  | High | + | + | 0 | 0 |
|  | Low | − | 0 | 0 | − |
|  | Very low | −− | −− | −− | −− |

Wherein the Fuzzy logic value corresponds with:

TABLE 2

| Fuzzy | ++ | + | 0 | − | −− |
|---|---|---|---|---|---|
| Time (s) | 30 | 20 | 10 | 5 | 0 |

The matrix is to be interpreted as:

If the scan distance logic value is very high and the ratio of scan distance over jump distance is very high then the time is ++, if the scan distance is high and the ratio of scan distance over jump distance is very high then the time is ++, if the scan distance is low and the ratio of scan distance over jump distance is very high then the time is +, . . . .

Figure 1B:
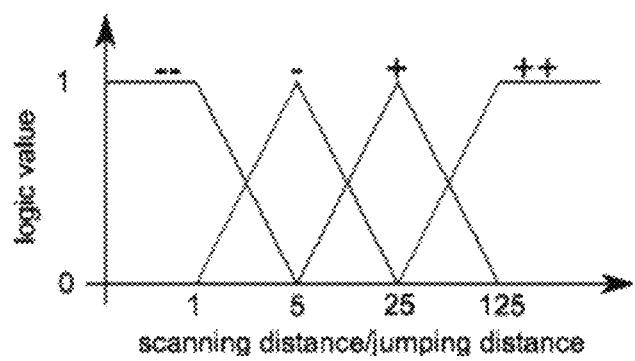

The relation between the fuzzy logic value and the scanning distance is provided in FIG. 1a. The relation between the fuzzy logic value and the Ratio of Scan distance over jump distance is provided in FIG. 1b.

Example 2

To aid the understanding of the present invention and to show the strengths of the system, several example geometries are presented for which the pre-stimulation waiting time to be used for the next layer is calculated according to example 1 and assuming all layers are built using a fixed stimulation power. Four geometries are used and for one of the geometries two separate vector types have been used (skin fill and hatching).

TABLE 3

|  | Geometry | | | | |
|---|---|---|---|---|---|
|  | 200 × 200 mm Skin fill | 200 × 200 mm Hatch | 10 × 200 mm Hatch | 40 × 50 mm Hatch | 10 × 10 mm Hatch |
| Pre-stimulation time (s) | 60 | 30 | 12.9 | 14.3 | 0 |

As can be seen areas susceptible to differential shrinkage are identified and give rise to increased waiting times.

Figure 2A:
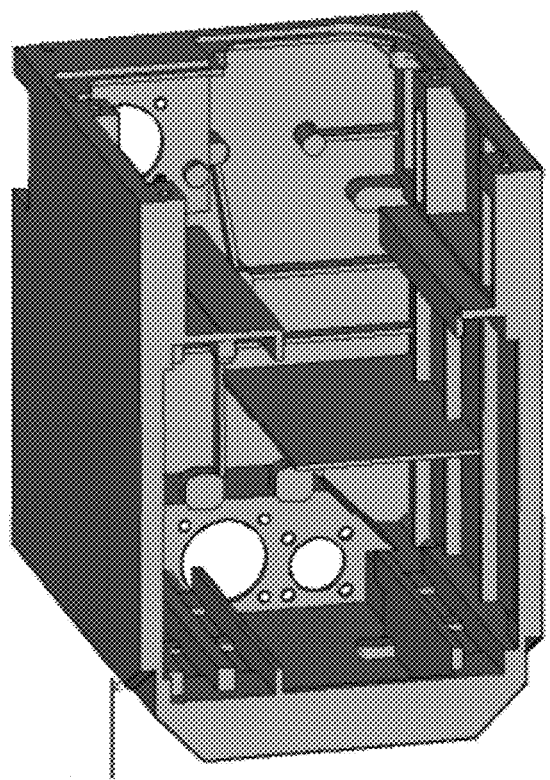
FIG. 2 provides an example of an object (a), the calculated pre-stimulation time for each of the layers composing the object (b) and the calculated stimulation power for each of the layers composing the object (c), according to a particular embodiment of the invention.
Figure 2B:
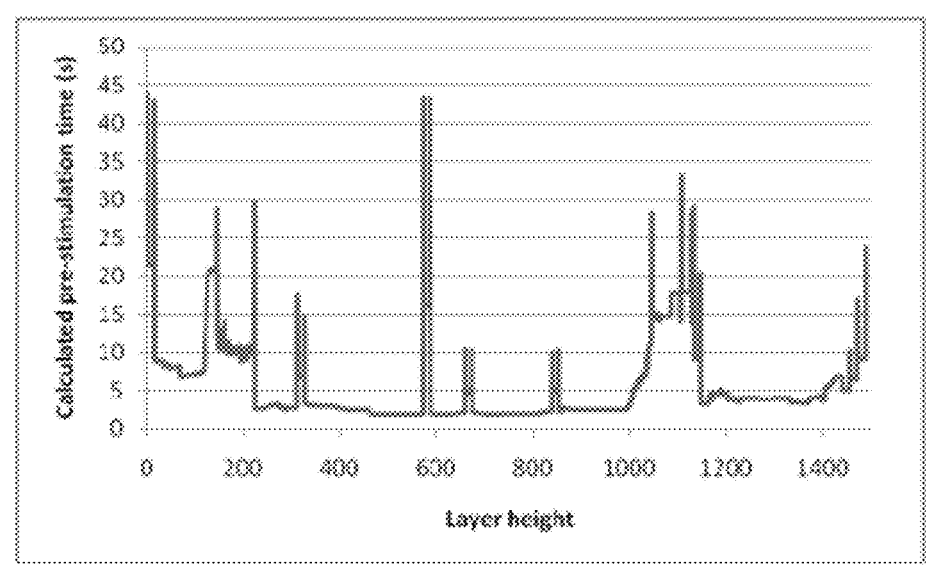

Whereas for simple geometries a person skilled in the art might assign several ranges of pre-stimulation waiting times, for complex parts individually determined pre-stimulation waiting times covering a continuous range of possible times cannot be obtained in this way. An example of such complex part is shown in FIG. 2a and the calculated pre-stimulation times are shown in FIG. 2b. As can be noticed, sections containing skin fill vectors are assigned higher pre-stimulation waiting times than layers not containing such vectors. Assigning pre-stimulation waiting times manually to a complex part like this can never maximize part quality within the given build time.

Example 3

Analogous to example 2 several example geometries are presented for which the suggested stimulation powers to be used in this layer are calculated assuming fixed pre-stimulation waiting times for all layers.

TABLE 4

|  | Geometry | | | | |
|---|---|---|---|---|---|
|  | 200 × 200 mm Skin fill | 200 × 200 mm Hatch | 10 × 200 mm Hatch | 40 × 50 mm Hatch | 10 × 10 mm Hatch |
| Stimulation power (mW) | 50 | 100 | 218 | 194 | 500 |

Figure 2C:
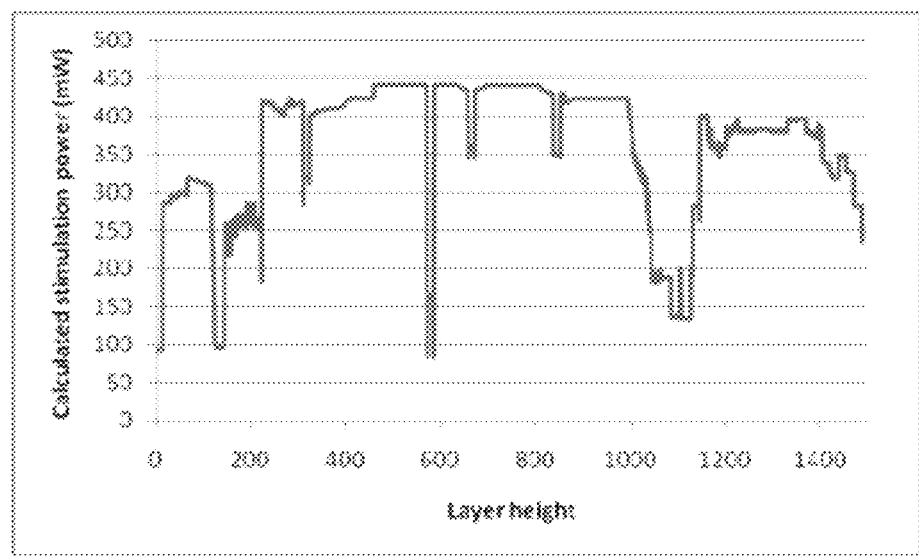

For the complex part shown in FIG. 2a the stimulation powers for all of the individual layers of the example part are shown in FIG. 2c assuming a fixed pre-stimulation waiting time for all layers.

Example 4

Analogous to the previous examples, both the stimulation power and the pre-stimulation waiting times could be determined for said example geometries.

The combination of both parameters is chosen such that the total building time is minimized for a given degree of shrinkage. To accomplish this, the suggested pre-stimulation time, $T_{predip}$, is first calculated separately assuming a standard stimulation power (150 mW in this case). Next the total actual scanning time, $T_{scan}$, of the geometry needs to be determined for the reference stimulation power. Note that this can differ from the real-life scanning time as delays introduced by scanner delays or the like are not included. The value thus obtained is influenced by other machine settings influencing scanning speed. The optimal building time is than obtained when the reference power is multiplied by a factor f given by:

$$f = \sqrt{\frac{T_{scan}}{T_{predip}}} \quad \text{(Formula III)}$$

The pre-stimulation waiting time is divided by the same factor. For the small geometry of 10×10 mm the maximal power and minimal pre-stimulation waiting time have already been reached and thus no further optimization takes place.

TABLE 5

| | Geometry | | | |
|---|---|---|---|---|
| | 200 × 200 mm (Hatch) | 10 × 200 mm (Hatch) | 40 × 50 mm (Hatch) | 10 × 10 mm (Hatch) |
| Stimulation power (mW) | 100 | 109 | 97 | 500 |
| Pre-stimulation time (s) | 30 | 6.5 | 7.2 | 0 |
| $T_{scan}$ (s) | 108.2 | 5.59 | 5.59 | / |
| $\sqrt{(T_{scan}/T_{predip})}$ | 1.9 | 0.93 | 0.88 | / |
| Stimulation power layer n(mW) | 190 | 140 | 85 | 500 |
| Pre-stimulation time layer n + 1 (s) | 57 | 6 | 6.3 | 0 |

Depending on user preferences one might choose not to use the minimization of total building time as the (only) criterion for combining the calculated stimulation powers and calculated pre-stimulation waiting times. One could imagine the user giving preference to lower stimulation powers rather than to increase the pre-stimulation waiting time. This could then all be included in the calculation.

Moreover when a platform contains multiple sections, one could take into account the fact that a decrease in scanning time obtained by an increased stimulation power is only effective for the section to which it is applied, while an increased pre-stimulation waiting time has an effect on all sections simultaneously.

Example 5

Also the manufacturing of several objects simultaneously can be optimized by use of the current invention. In the present example it is demonstrated how, through a change of the illumination order of sections of the lamina being formed, the total layer time can be reduced while maintaining the optimal pre-stimulation waiting time for each of the sections, and thereby maintaining the quality of the objects under construction.

Figure 3A:
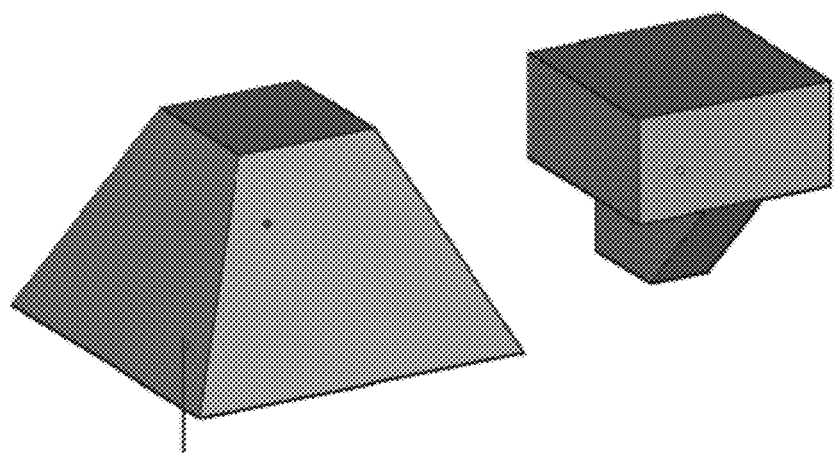
FIG. 3 provides an example of two parts (a), the calculated pre-stimulation times for each of the two parts (b), the calculated scanning time for each of the two parts (c) and the total layer times (scanning time+pre-stimulation time) for different orders of scanning the sections corresponding to parts 1 and 2 (d), according to a particular embodiment of the invention.
Figure 3B:
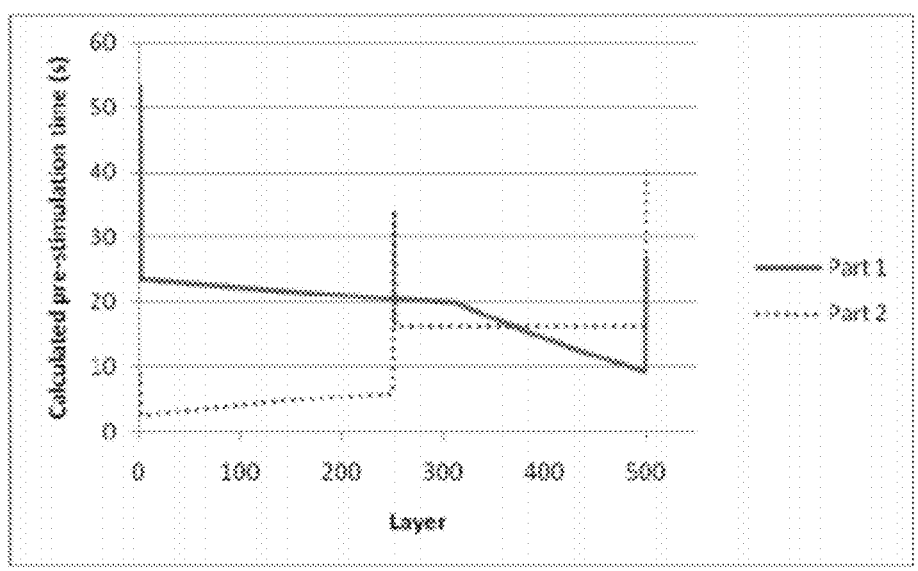
Figure 3C:
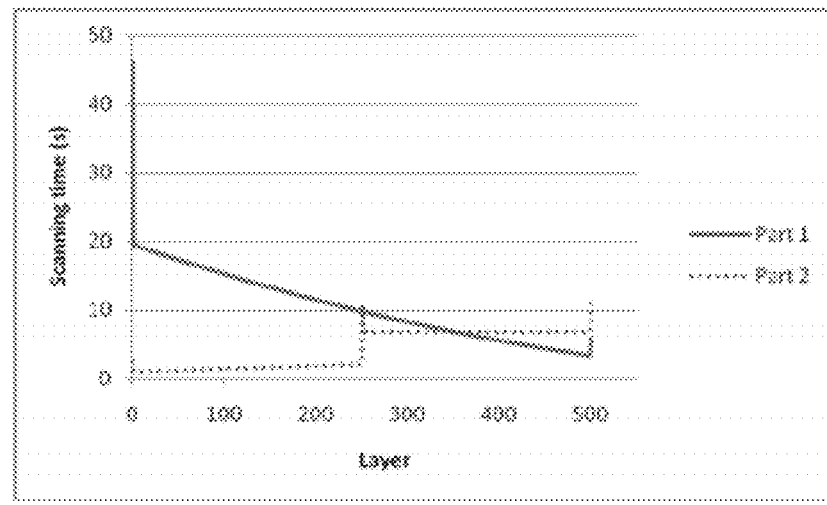
Figure 3D:
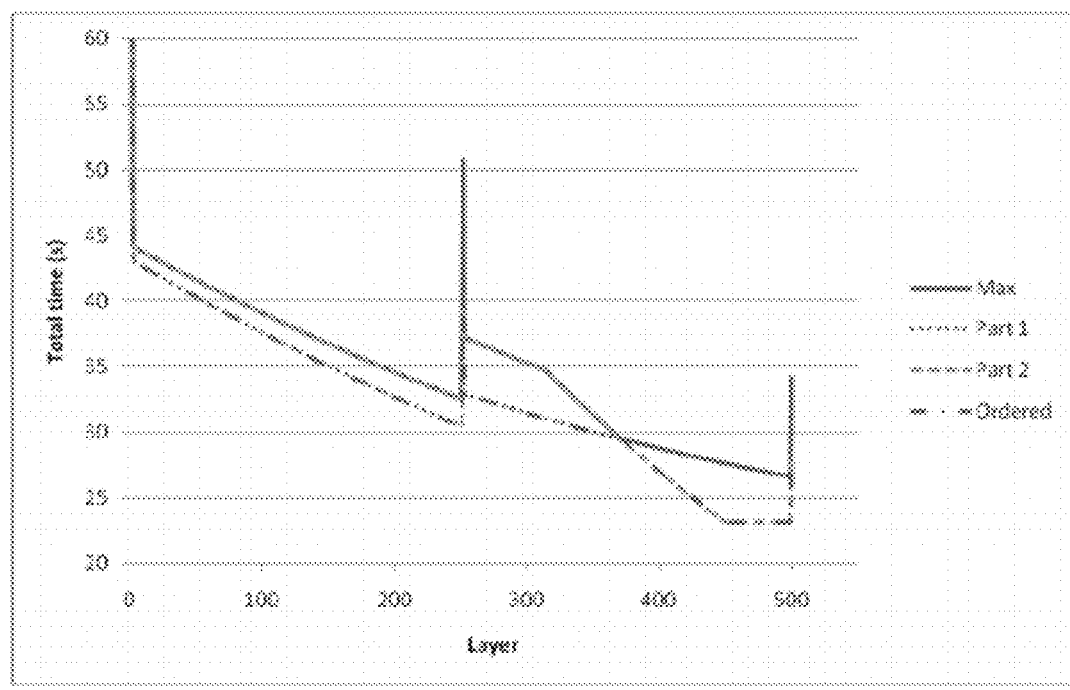

The calculated pre-stimulation times for each of the two parts of FIG. 3a is shown in FIG. 3b and the calculated scanning time for each of the two parts displayed in FIG. 3c. FIG. 3d provides the total layer times (scanning time+pre-stimulation time) for different orders of scanning the sections corresponding to parts 1 and 2 as displayed in FIG. 3a.

The present invention provides that the pre-stimulation waiting time for the simultaneous building of objects 1 and 2 (shown in FIG. 3a) is chosen as the maximum of the individually calculated pre-stimulation waiting times. This ensures the optimal quality, but is not always the most efficient in view of total construction time. The is demonstrated in FIG. 3d under "Max".

Furthermore, the total construction time is reduced by starting the count-down of the pre-stimulation period associated with the first object after the stimulation of said first object has been finished. After the sections associated with the second object have been stimulated the pre-stimulation period associated with said object also starts. Upon completion of both pre-stimulation time periods the overall pre-stimulation waiting time is said to be finished. This is also illustrated in FIG. 3d, where the construction time for each layer is given assuming sections associated with object 1 are stimulated first and separately for the case where sections associated with object 2 are stimulated first. This is demonstrated in FIG. 3d under "Part 1" and "Part 2".

Also particular embodiments of the methods of the present invention provide that the total construction is further minimized by choosing the order in which the sections associated with the objects are scanned, and more particularly adapting it so that the sections requiring the highest pre-stimulation period are scanned first. The is demonstrated in FIG. 3d under "Ordered".

Example 6

Figure 4A:
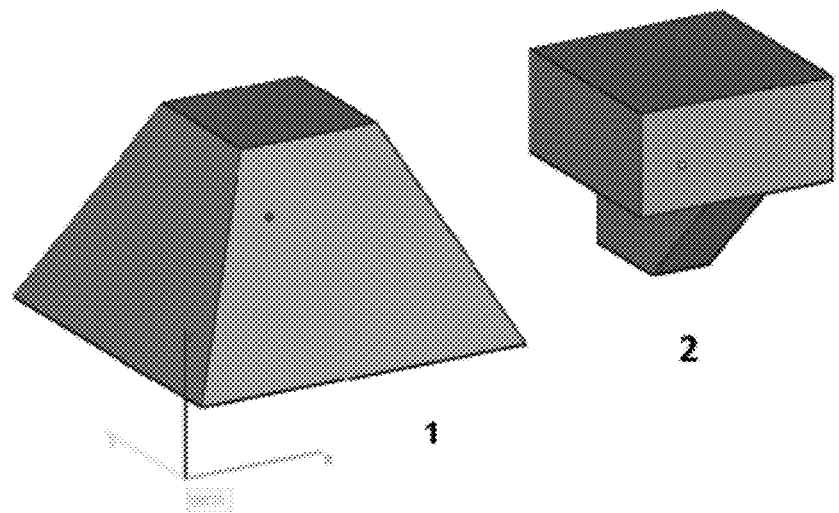
FIG. 4 provides an example of two parts in two different orientations (a and b) and the total construction time of both items (c), according to a particular embodiment of the invention.
Figure 4B:
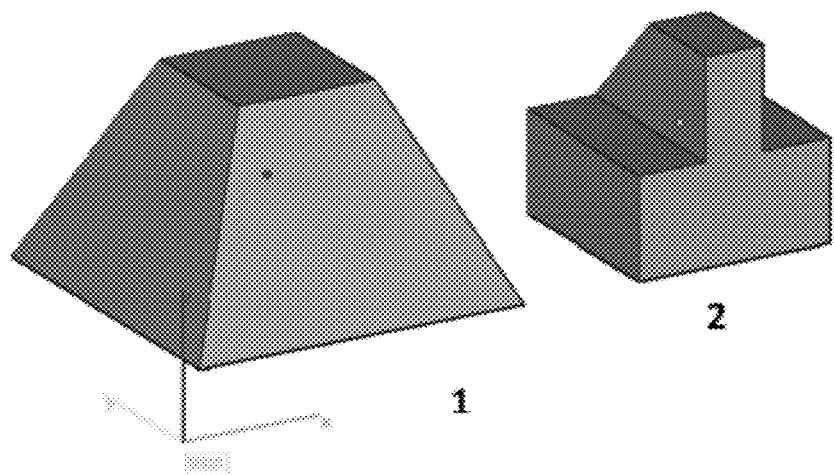
Figure 4C:
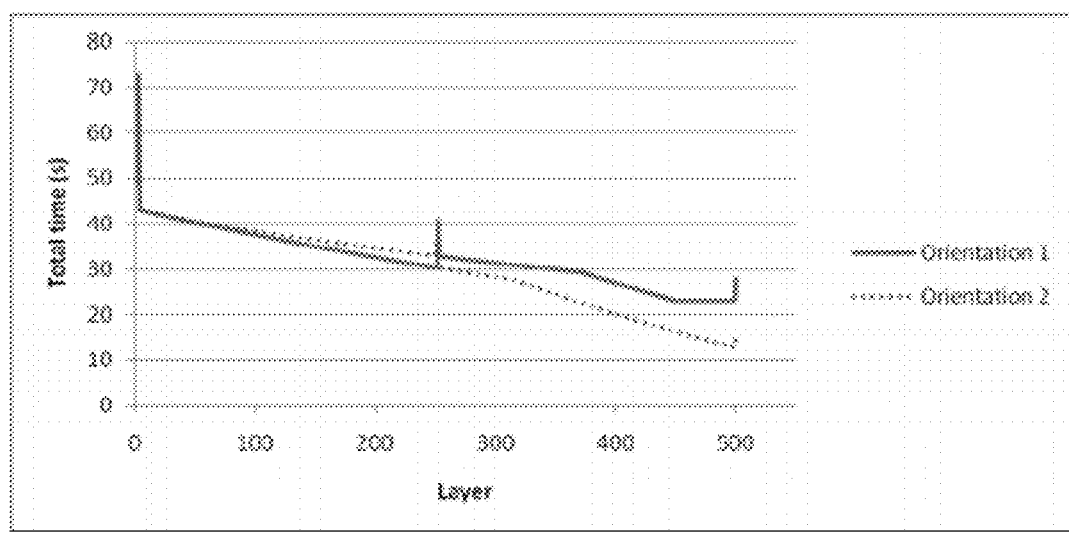

The current invention also provides a method by which the simultaneous construction of several objects can be optimized by altering the orientation of the objects with respect to each other. Assume both objects depicted in FIG. 4a are to be constructed simultaneously. Assuming the orientation of object 1 is fixed, the orientation of object 2 can be adapted (see FIG. 4b) so as to minimize the total construction time of both items (see FIG. 4c) by ensuring a maximum overlap in layers requiring long (short) pre-stimulation times in both objects.

Example 7

Figure 5:
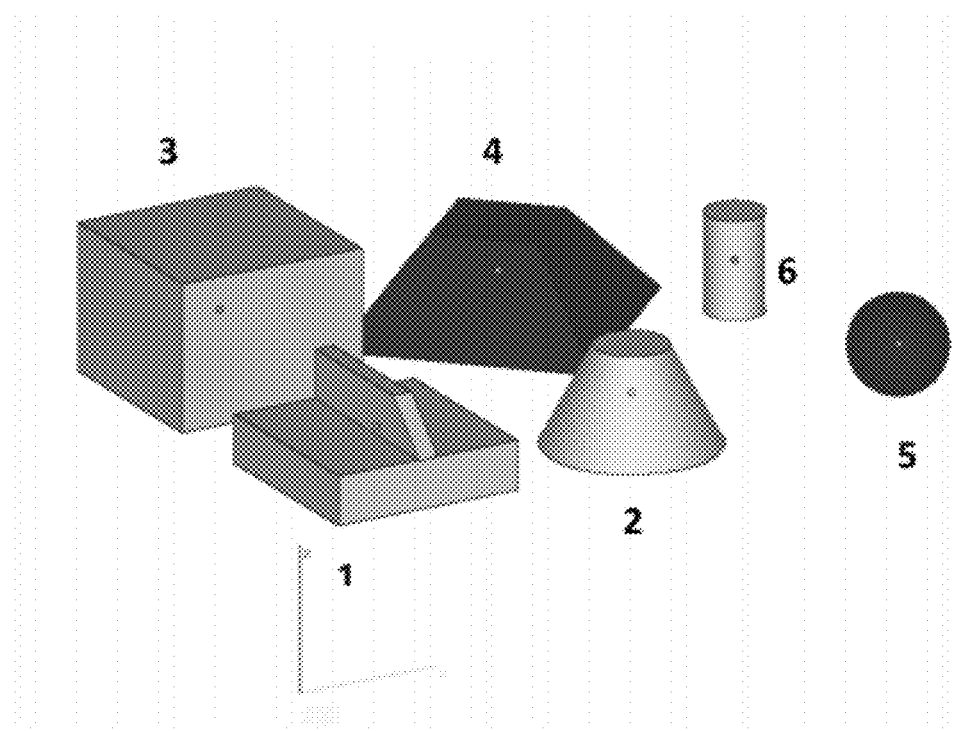
FIG. 5 provides an example of six parts to be construed using the method according to particular embodiments of the invention.

In particular embodiments, the methods according to the present invention also provide that the construction of several objects can be optimized by selecting which objects are to be combined in each run (assuming more objects are to be constructed than can be fit in a single run). As an example, assume that all parts displayed in FIG. 5 need to be constructed, but only four of them will fit in the machine at once. According to particular embodiments of the methods of the present invention the objects to be built together are chosen such that the pre-stimulation times for the different layers correspond as much as possible for the different objects.

In the present example, part 5 and 6 are then best built separately because none of the other parts require long pre-stimulation waiting times, as is the case for part 6, or the sections requiring higher pre-stimulation times in other parts do not coincide with sections requiring high pre-stimulation time such as the case for part 5 and/or cannot be oriented to make them coincide.

The invention claimed is:

1. A method for the manufacturing of at least one three-dimensional object wherein the object or part thereof comprises a plurality of adhered laminae, comprising the steps of:

a) depositing a layer of a liquid resin, over a manufacturing area comprising previously formed lamina n−1 of the object;
b) selecting a stimulation power for forming layer n, wherein the stimulation power is either a predetermined value or a value based upon parameters of one or more laminas selected from laminas n−5 to n+5 such as to minimize shrinkage or deformation of the object;
c) exposing at least part of the manufacturing area to stimulation of a stimulation pattern determined based on a computer-generated CAD file of the object using the stimulation power selected in step b, thereby polymerizing the resin of the stimulated areas and forming a lamina n of the object;
d) selecting the pre-stimulation waiting time for forming lamina n+1, wherein the pre-stimulation waiting time is either a predetermined value or a value based on parameters of one or more of laminas n−5 to n+5 such as to minimize shrinkage or deformation of the object; and;
e) successively repeating steps a) through d) wherein in at least one of steps (b) and (d) a value based upon parameters of one or more laminas selected from laminas n−5 to n+5 is selected.

2. The method for the manufacturing of at least one three-dimensional object of claim 1, comprising the steps of:
a) depositing a layer of liquid resin, over a manufacturing area comprising previously formed lamina n−1 of the object;
b) selecting a stimulation power for forming layer n, wherein the stimulation power is either a predetermined value or a value based upon parameters of laminas n and/or n+1 such as to minimize shrinkage or deformation of the object;
c) exposing at least part of the manufacturing area to stimulation of a stimulation pattern determined based on a computer-generated CAD file of the object using the stimulation power selected in step b, thereby polymerizing the resin of the 30 stimulated areas and forming a lamina n of the object;
d) selecting the pre-stimulation waiting time for forming lamina n+1, wherein the restimulation waiting time is either a predetermined value or a value based on parameters of lamina n such as to minimize shrinkage or deformation of the object; and;
e) successively repeating steps a) through d) wherein in at least one of steps (b) and (d) a value based upon parameters of one or more laminas selected from laminas n−5 to n+5 is selected.

3. The method of claim 2, wherein the parameters for determining the stimulation power for lamina n are chosen from the group comprising the total scanning distance and/or the total jumping distance of the stimulation pattern for lamina n, the pre-stimulation waiting time for lamina n+1 and/or the resin type.

4. The method of claim 2, wherein the parameters for determining the prestimulation waiting time for lamina n+1 are chosen from the group comprising the total scanning distance and/or the total jumping distance of the stimulation pattern for lamina n, stimulation power applied for lamina n and/or the resin type.

5. The method of claim 1, wherein the pre-stimulation waiting time and/or stimulation power is determined by fuzzy logic.

6. The method of any of claim 1, wherein the stimulation power (P) is determined of Formula I:

$$P = P_{st} \cdot \frac{T_p \cdot f_{resin}}{T_{ref}} \quad \text{(Formula I)}$$

wherein $T_p$ refers to the pre-stimulation time, $T_{ref}$ refers to a reference pre-stimulation time, $f_{resin}$ refers to the resin scaling factor and $P_{st}$ refers to the power calculated based on a total scanning distance and a total jumping distance.

7. The method of claim 1, wherein the pre-stimulation waiting time ($T_p$) is determined of Formula II:

$$T_p = T_{st} \cdot \frac{P \cdot f_{resin}}{P_{ref}} \quad \text{(Formula II)}$$

wherein P refers to the stimulation power, $P_{ref}$ refers to a reference stimulation power, $f_{resin}$ refers to the resin scaling factor and $T_{st}$ refers to the time calculated based on a total scanning distance and a total jumping distance.

8. The method of claim 1, wherein the layer or lamina comprise at least two separate sections or fields, the stimulation power and/or pre-stimulation waiting time being calculated for each of the sections or fields and wherein the stimulation power used for the layer is determined as the minimum of all stimulation powers for the sections or fields and/or wherein the pre-stimulation waiting time used for the layer is determined as the maximum of all pre-stimulation waiting times for the sections or fields.

9. The method of claim 1, wherein the layer or lamina comprise at least two separate sections or fields, the stimulation power being calculated for each of the sections or fields and wherein each of the sections or fields is stimulated of the calculated stimulation power.

10. The method of claim 9, wherein a stimulation power is calculated for each stimulation pattern within the field, wherein each of the stimulation patterns is stimulated of the calculated stimulation power.

11. The method of claim 1, wherein a pre-stimulation waiting time is calculated for each specific type of stimulation pattern within a section or field, and the pre-stimulation waiting time of the section or field is determined as the maximum of all pre-stimulation waiting times for the specific type of stimulation pattern.

12. The method of claim 1, which further either comprises comparing a desired total manufacturing time which is longer than the estimated manufacturing time and adjusting the stimulation power and/or the pre-stimulation waiting time for each layer accordingly to optimize quality of the object or taking into account a desired total manufacturing time which is shorter than the estimated manufacturing time and adjusting the stimulation power and/or the pre-stimulation waiting times accordingly to reduce total building time.

13. The method claim 12, wherein the comparison is performed after one or more layers are formed and the pre-stimulation waiting time and/or stimulation power for the subsequent layer(s) is adjusted accordingly.

14. The method of claim 12, wherein all pre-stimulation waiting times and/or stimulation powers are increased or decreased proportionally.

15. The method of claim 12, wherein a reduction of the total building time is required and the stimulation powers are adjusted such that the higher powers are increased the most and/or the pre-stimulation waiting times are adjusted such that the lower waiting times are reduced the most.

16. The method of claim 1, wherein the lamina comprise at least two separate sections or fields with different calculated pre-stimulation waiting times, and the method comprises adjusting the order in which the sections or fields are exposed, whereby the section(s) or fields for which the highest pre-stimulation waiting time is calculated is(are) stimulated first.

17. A method for optimizing the build of different objects by additive manufacturing, the method comprising,
   (a) determining the optimal pre-stimulation waiting time for the different layers of each object by determining the pre-stimulation waiting time for each layer based on the total scanning distance and the total jumping distance of the scanning vectors, the stimulation power applied and the liquid resin type such as to minimize shrinkage or deformation of the object; and;
   (b) selecting to combine the manufacture of two or more of the objects on one manufacturing platform based on a comparison of the optimal pre-stimulation waiting times of the objects.

18. The method of claim 17, wherein the orientation and/or distribution of the two or more objects is adapted based on a comparison of the optimal pre-stimulation waiting times of the objects.

* * * * *